United States Patent [19]
Prouty

[11] Patent Number: 5,986,658
[45] Date of Patent: Nov. 16, 1999

[54] METHOD AND APPARATUS FOR RASTER COMPUTER GRAPHICS DISPLAY OF ROTATION INVARIANT LINE STYLES

[75] Inventor: Bryan G Prouty, Wellington, Colo.

[73] Assignee: Hewlett-Packard Co., Palo Alto, Calif.

[21] Appl. No.: 08/792,362

[22] Filed: Jan. 31, 1997

[51] Int. Cl.$^6$ .................................................. G06T 17/00
[52] U.S. Cl. ............................................................ 345/418
[58] Field of Search ................................... 345/418, 437, 345/433, 419, 436, 438

[56] References Cited

U.S. PATENT DOCUMENTS

| | | | |
|---|---|---|---|
| 4,219,763 | 8/1980 | Dalke | 345/437 X |
| 4,635,212 | 1/1987 | Hatazawa | 345/437 |
| 4,947,344 | 8/1990 | Hayashi et al. | 345/437 |
| 4,985,849 | 1/1991 | Hideaki | 345/437 |
| 5,471,574 | 11/1995 | Prasad | 395/142 |
| 5,519,822 | 5/1996 | Barkans et al. | 395/143 |
| 5,793,378 | 8/1998 | Truong et al. | 345/437 |

OTHER PUBLICATIONS

Yevgeny P. Kuzmin, "Bresenham's Line Generation Algorithm with Built–in Clipping", IBS Graphics Technologies, Moscow, (c) The Eurographics Association 1995, pp. 275–280.

J.E. Bresenham, "Algorithm for Computer Control of a Digital Plotter", IBM Systems Journal, vol. 4, No. 1, 1965, pp. 25–30.

Graham J. Dunnett, et al., "The Image Chip for High Performance 3D Rendering", IEEE, Computer Graphics & Applications, Nov. 1992, pp. 41–52.

Jack Bresenham, "A Linear Algorithm for Incremental Digital of Circular Arcs", Communications of the ACM, vol. 20, No. 2, Feb. 1977, pp. 100–106.

Adrian Nye, "Xlib Programming Manual" for Version 11 of the X Window System, O'Reilly & Associates, Inc., vol. 1, Third Edition, Jul. 1992, ISBN 1–56592–002–3, pp. 122–132.

Tom Gaskins, "PEXlib Programming Manual", O'Reilly & Associates, Inc., First Edition, Dec. 1992, ISBN 0–56592–028–7, pp. 224–231.

Jackie Neider, et al. "OpenGL Programming Guide—The Official Guide to Learning OpenGL, Release 1", OpenGL Architecture Review Board, Addison–Wesley Publishing Company, pp. 33–45.

David F. Rogers, "Procedural Elements for Computer Graphics", McGraw–Hill, Inc., ISBN 0–07–053534–5, pp. 30–39.

Primary Examiner—Phu K. Nguyen
Assistant Examiner—Cliff N. Vo
Attorney, Agent, or Firm—Jack Lenell

[57] ABSTRACT

A method and apparatus for displaying line rotation on a raster computer graphics display, so that substantially rotated versions of original lines maintain a line style pattern that is identical to a line style pattern of the original lines. The invention includes controlling the line style of the substantially rotated version based upon rotation of the substantially rotated version. A line style array is stored in a computer memory for storing consecutive line style pattern features of the substantially rotated version of the first line and assigning a respective length value to each of the pattern features. A line style feature pixel counter is used for counting the pixels of each line style pattern feature. A comparator is used for comparing the incremented pixel counter to the respective length value. A pixel step value is scaled based upon a trigonometric function of the rotation of the substantially rotated version so as to generate a scaled pixel step value. An incrementer is used for incrementing the pixel counter by the scaled pixel step value.

20 Claims, 6 Drawing Sheets

```
api_dash_length  = dash_length << 16;                              301 api_dash_offset  = dash_offset;                                    303 api_dash_list    = dash_list;                                      305 x=xstart;                                                          307
y=ystart;

xlength = xend - xstart;                                           309
ylength = yend - ystart;

if (xlength >= ylength)                                            310
        major_length = xlength;
        angle = (ylength << 16)/(xlength << 16)
        xmajor = 1;

else
        major_length=ylength;
        angle=(ylength<<16)/(xlength<<16);
        xmajor=0;

step =approximate( ((xlength^2 + ylength^2)^1/2 /major_length);    311 line_length_count=0;                                               313 api_dash_length_count=0;                                           315
```

FIG.3A

```
while(line_length_count<major_length                              317
    dash_length_=api_dash_list[api_dash_offset];                  319
    dash_color_=api_dash_color[api_dash_offset];                  321
            while(api_dash_length_count<dash_length)              323
325 hardware draw pixel at major, minor with dash color
327 line_length_count=line_length_count + 1;
329 if(line_length_count==major_length)return;
331 api_dash_length_count=api_dash_length_count + step;
233 update x,y to next pixel in line using xmajor and angle;
    end while
  api_dash_length_count=0;   335
end while
```

FIG.3B

METHOD AND APPARATUS FOR RASTER COMPUTER GRAPHICS DISPLAY OF ROTATION INVARIANT LINE STYLES

FIELD OF THE INVENTION

The invention relates to high performance computer graphics and more particularly to an apparatus and method for raster display of complex line styles of rotated lines in real time.

BACKGROUND OF THE INVENTION

Various computer graphics methods are known for drawing lines on raster computer graphics displays. For example, a well known computationally efficient method named after J. E. Bresenham. In accordance with the Bresenham method lines are drawn on a raster computer graphics display using pixels that are assigned integral coordinates relative to a notional rectangular coordinate system having a horizontal X major axis and having a vertical Y major axis. For each consecutive unit step along the horizontal X major axis, the Bresenham method is used to select a pixel from a respective vertical column of pixels corresponding to that unit step. The Bresenham method is discussed in his seminal paper published in the IBM Systems Journal, Vol. 4, No. 1 (1965), pg. 25–30. Similarly, other well known line drawing methods select pixels based on consecutive unit steps along the horizontal X major axis. The Digital Differential Analyzer (DDA) method is described in "Procedural Elements For Computer Graphics" by David F. Rogers 1985. ISBN:0-07-53534-5. pages 30–34.

Since a raster computer graphics display may show a large number lines, the many lines are advantageously distinguished by drawing lines using complex line styles (also known as a line type). For example, on the raster computer graphics display a first line may be easily distinguished from a second line if the first line is drawn using a first stippled pattern, and the second line is drawn using a second stippled pattern that is different than the first stippled pattern. As another example, the first line may be easily distinguished from the second line if the first line is drawn using a first colored pattern, and the second line is drawn using a second colored pattern that is different than the first colored pattern.

Various computer graphics methods, libraries, primitives, and the like are known for drawing lines with various line styles, line types, stippled patterns, colored patterns, and the like. Appendix A shows illustrative pseudocode for drawing lines with a stippled line style using X window system high performance graphics. Appendix B shows illustrative pseudocode for drawing lines with a stippled line style using OpenGL high performance graphics. In previously known computer graphics methods, as the line is drawn by selecting pixels based on consecutive unit steps along the horizontal X major axis, the unit step is also used to control the style of the line such as it is being drawn.

High performance computer graphics advantageously provide for computer users interacting with lines on a computer display in real time, just as if the lines were physical objects in the real world. For a three dimensional object depicted in isometric view by an arrangement of lines on the raster computer graphics display, a computer user may use computer controls to rotate the depiction in real time, just as the user would rotate physical objects in the real world. Accordingly a user who initiates rotation of such lines unconsciously expects line style patterns to remain identical as they are rotated in real time, just as features of objects in the real world remain identical when they are rotated.

Unfortunately, using previously known real time computer graphics drawing methods, line style patterns appear to shift and change as lines are substantially rotated. Unconsciously, the computer user experiences feelings of annoyance and confusion as the line style patterns appear to shift and change, since this is contrary to the user's expectations. This is particularly true for substantially rotating the depiction of the three dimensional object in real time, since the depiction of the object includes multiple lines and exhibits a distracting shimmering effect as the line style patterns of the lines of the depiction shift and change.

FIG. 1A is an overlay showing lines drawn using real time graphics drawing methods typical of the prior art. For example first line 101 has a complex stippled pattern as follows:

16 pixels-on
16 pixels-off
8 pixels-on
8 pixels-off
16 pixels-on

Accordingly, this pattern is repeated as follows along the length of the line:

16 pixels-on
16 pixels-off
8 pixels-on
8 pixels-off
16 pixels-on
16 pixels-on
16 pixels-off
8 pixels-on
8 pixels-off
16 pixels-on Therefore, it should be understood that a long section of 32 pixels-on is repeated once per pattern repeat, so as to provide the 16 pixels-on section at the beginning, and then the longer 32 pixels-on sections at the pattern junctions.

As shown in overlay in FIG. 1A, each of seventeen successive substantially rotated versions of the first line include a respective stippled pattern in the substantially rotated versions that is shifted and changed in comparison with the stippled pattern of the first line.

In general, increased shift and change in the stippled pattern correspond to increased rotation. For example, in FIG. 1A increased shift and change is shown in the seventeenth substantially rotated version of the first line, which is rotated approximately forty-five degrees with respect to the horizontal X major axis. It is theorized by the present inventor that root causes of these limitations in the previously known graphics methods are that consecutive unit steps along the horizontal X major axis are used to control the style of the line such as it is being drawn (regardless of the rotation of the substantially rotated versions of the first line), and that drawing of the line style is not corrected based on the rotation.

It is theorized by the present inventor that the amount of change in line segment length between two lines is computed by the equation.

$$\cos(a0)-\cos(a1)$$

where a0 is the angle of rotation of a first line (with respect to one of the axis), and a1 is the angle of rotation of a second line (with respect to the axis) that is rotated with respect to the first line.

Thus, for a change from 0 to 2 degrees the change in line segment length is:

$$\cos(0) - \cos(2) = 1.0 - 0.99939 = 0.000609$$

and for a change from 43 to 45 degrees the change in line segment length is:

$$\cos(43) - \cos(45) = 0.73135 - 0.7071 = 0.02424$$

Accordingly, the percent change in line segment length is related to the angle of rotation, not just the difference in angle. To illustrate this relationship, the change in line segment length is normalized by the change in angle and the result is plotted as versus rotation angle as shown in FIG. 1B. In the limit as the delta, a0–a1, becomes arbitrarily small, this becomes the derivative of the cosine function, which is just the sine function. This is expressed as the following ratio:

$$\frac{\cos(a0) - \cos(a1)}{a0 - a1}$$

as the delta, a0–a1, becomes arbitrarily small.

The present inventor particularly points out that the sine function starts with a function value of 0 at an angle of 0. This is why an insubstantially rotated version of the line near the axis does not result in shifts and changes in the stippled pattern of more than half of a pixel (unless the line is very long). Accordingly a substantially rotated version of the original line is defined as a version of the original line that is rotated by a sufficient amount so that the stippled pattern of the substantially rotated version of the line would have shifted and changed by more than half of a pixel with respect to the original line if the substantially rotated version of the line were drawn using the methods of the prior art, as illustrated for example in FIG. 1A.

What is needed is an efficient method and apparatus for displaying line rotation in real time on the raster computer graphics display so that substantially rotated versions of original lines maintain a complex line style pattern that is identical to a complex line style pattern of the original lines.

SUMMARY OF THE INVENTION

The present invention provides a method and apparatus for displaying line rotation on a raster computer graphics display in real time so that substantially rotated versions of original lines maintain a complex line style pattern that does not change by more than half a pixel, so as to be identical to a complex line style pattern of the original lines. For example, in one embodiment the invention displays a substantially rotated version of a first line on the raster computer graphics display so that the substantially rotated version maintains a stippled pattern so as to be identical to the stippled pattern of the first line. In another embodiment the invention displays a substantially rotated version of the first line on the raster computer graphics display so that the substantially rotated version maintains a colored pattern that is the identical the colored pattern of the first line. Since this is in accordance with a computer user's expectations, the present invention advantageously avoids evoking feelings annoyance and confusion in the computer user, which would be caused if the line style patterns were to appear to shift and change during the real time rotation.

Briefly, and in general terms, the invention includes controlling the line style of the substantially rotated version based upon rotation of the substantially rotated version. A line style array is stored in a computer memory for storing consecutive line style pattern features of the substantially rotated version of the first line and assigning a respective length value to each of the pattern features. A line style feature pixel counter is used for counting the pixels of each line style pattern feature. A comparator is used for comparing the incremented pixel counter to the respective length value. In the preferred embodiments, a pixel step value is scaled based upon a trigonometric function of the rotation of the substantially rotated version (or a piecewise linear approximation of the trigonometric function), so as to generate a scaled pixel step value. An incrementer is used for incrementing the pixel counter by the scaled pixel step value.

An alternative embodiment of the invention includes scaling a respective length value assigned to each of the features of the line style pattern, based upon a trigonometric function of the rotation of the substantially rotated version, so as to generate respective scaled length values. The substantially rotated version of the first line is displayed in real time using the scaled length values for each of the pattern features, so that the substantially rotated version maintains the complex line style pattern that is the identical the complex line style pattern of the first line.

Other aspects and advantages of the present invention will become apparent from the following detailed description, taken in conjunction with the accompanying drawings, illustrating by way of example the principles of the invention.

BRIEF DESCRIPTION OF THE DRAWINGS

FIGS. 3A and 3B show a simplified flow chart for illustrating software executing on the processor element shown in FIG. 2.

DETAILED DESCRIPTION OF THE PREFERRED EMBODIMENT

Figure 1A:
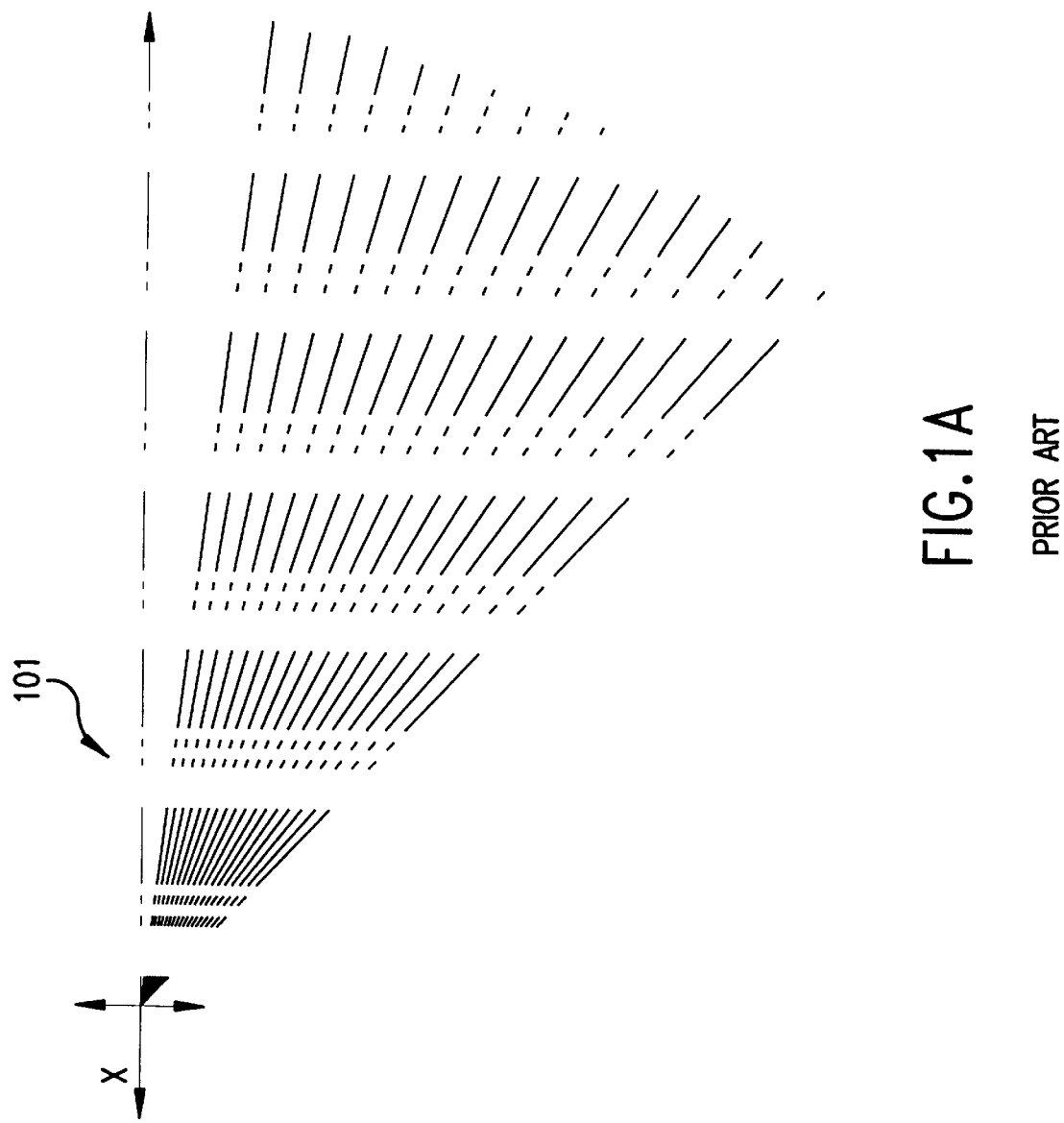
FIG. 1A is an overlay showing lines drawn using real time graphics drawing methods typical of the prior art.
Figure 1B:
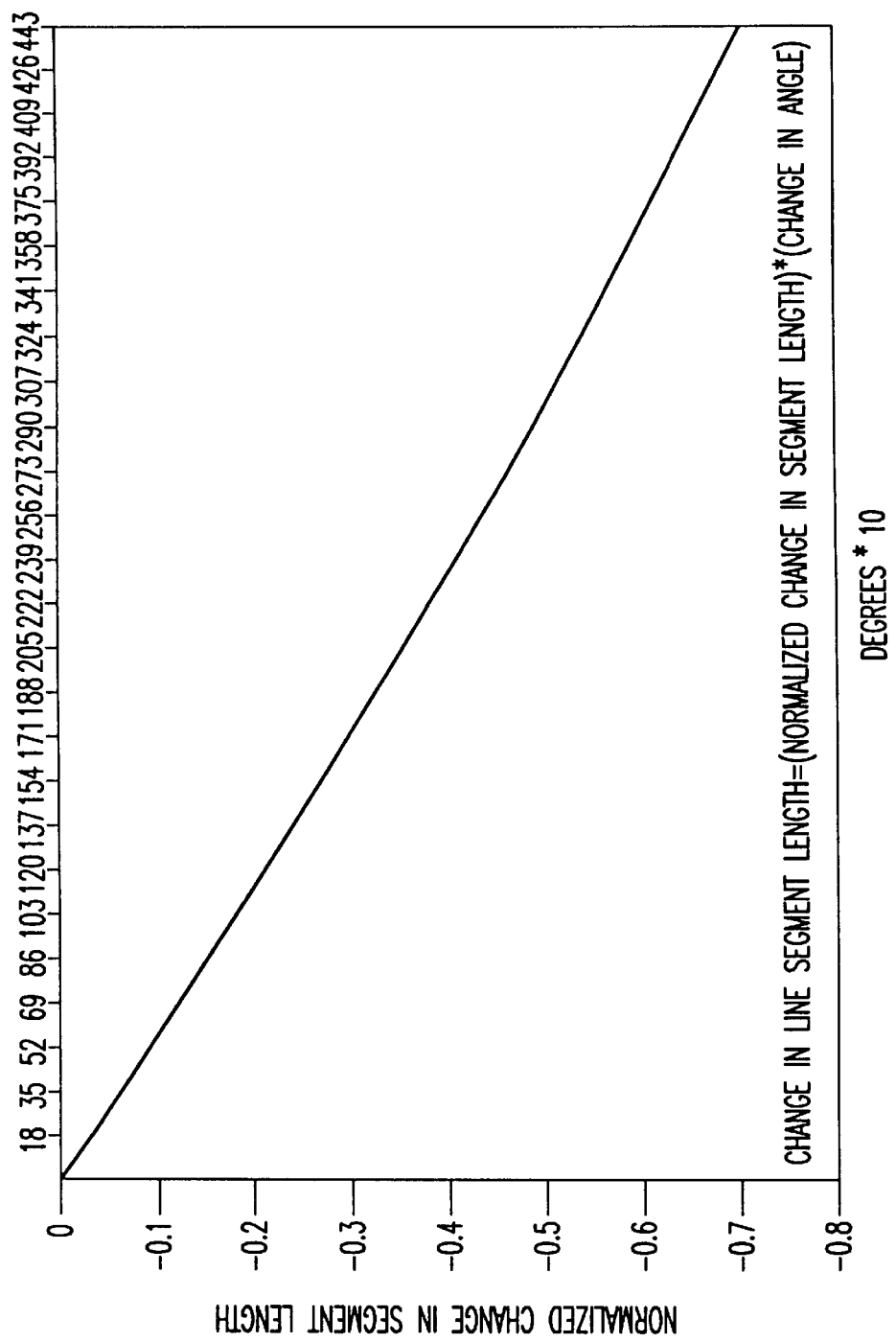
FIG. 1B is a graph of change in line segment length normalized by change in angle and the result plotted versus rotation angle.
Figure 2:
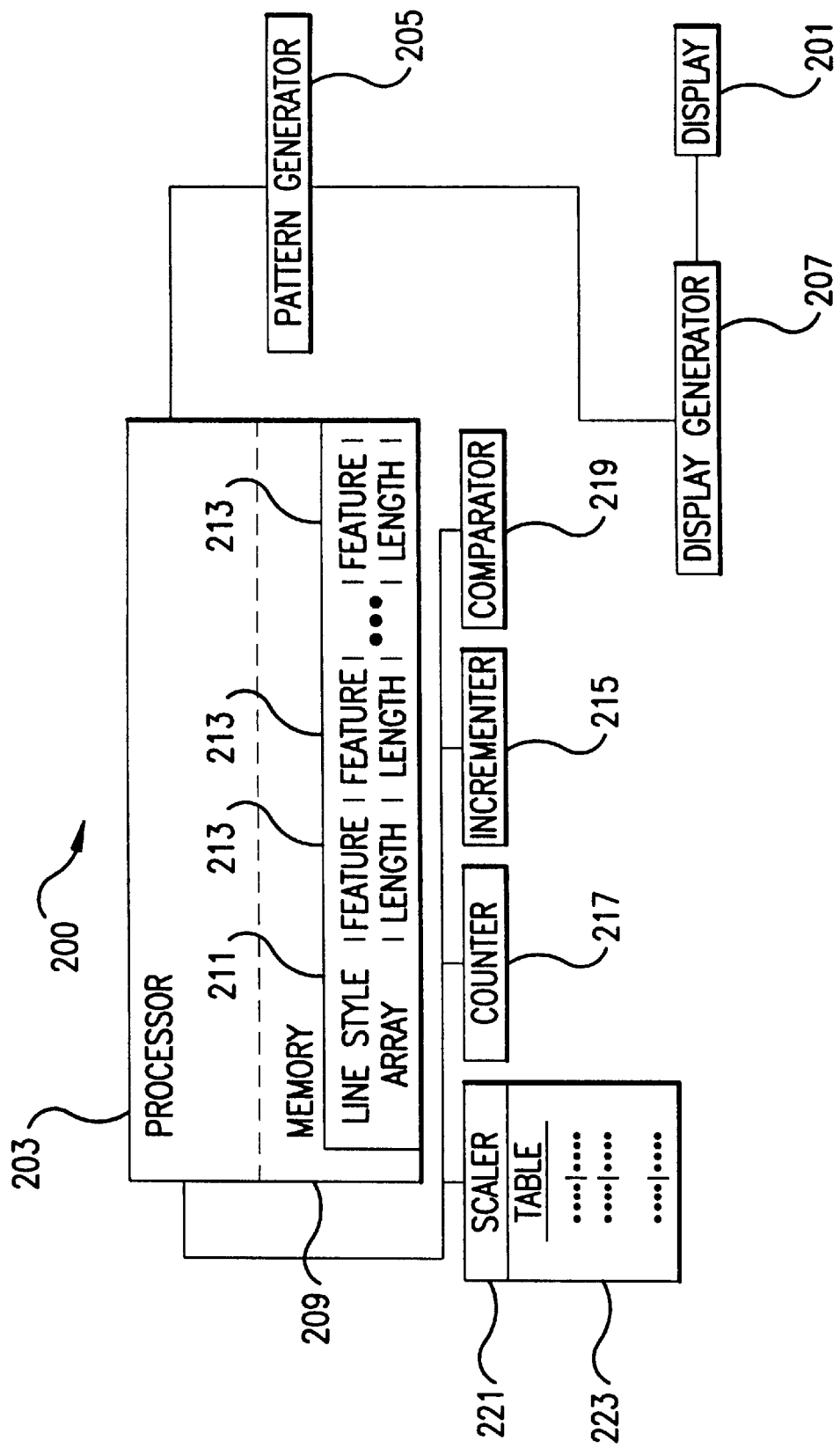
FIG. 2 is a functional block diagram illustrating a preferred embodiment of the invention.

FIG. 2 is a functional block diagram illustrating a preferred embodiment of the invention 200. Lines are drawn on a raster computer graphics display 201 in real time using pixels that are assigned integral coordinates relative to a notional rectangular coordinate system having a horizontal X major axis and having a vertical Y major axis. For each consecutive unit step along the horizontal X major axis, pixels are selected based on line style teachings of the invention from a respective vertical column of pixels corresponding to that unit step. The raster computer graphics display may be a video display, or other suitable raster display for computer graphics.

A controller is coupled with the raster computer graphics display for displaying a first line having a complex line style pattern on the raster computer graphics display, and for displaying in real time a substantially rotated version of the first line on the raster computer graphics display so that the substantially rotated version maintains a complex line style pattern that is identical to the line style pattern of the first line. A complex line style pattern is defined herein as a line style pattern that is not trivially simple. A user interface is coupled with the controller, but is not shown in FIG. 2.

The controller includes a processor element 203, preferable a high performance microprocessor or a high performance application specific integrated circuit state machine. A pattern generator 205 generates consecutive line style pattern features of the substantially rotated version of the first line while assigning a respective length value to each of the pattern features. A display generator 207 is coupled with the pattern generator and the raster computer graphics display for generating the display of the substantially rotated version of the first line.

In the preferred embodiment a memory 209 is integrally coupled with the processor element for storing consecutive line style pattern features of the substantially rotated version of the first line and recording the respective length value of each of the pattern features 213. Preferably, one or more of a line style array 211 records the length of each stipple pattern feature 213 or each color pattern feature 213 of the array. For example, for a line style of a complex stippled pattern as follows:

16 pixels-on
16 pixels-off
8 pixels-on
8 pixels-off
16 pixels-on;

the style array records a first pixel-on pattern feature having a feature length of sixteen pixels, a subsequent pixel-off pattern feature having a feature length of sixteen pixels, a subsequent pixel-on pattern feature having a feature length of eight pixels, a subsequent pixel-off pattern feature having a feature length of eight pixels, and a subsequent pixel-on pattern feature having a feature length of sixteen pixels.

An incrementer 215 and a line style feature pixel counter 217 are used for counting the pixels of each line style pattern feature. A comparator 219 is used for comparing the incremented pixel counter to the respective length value and for determining when the feature length is achieved.

In accordance with the principles of the invention, the line style of the substantially rotated version is controlled based upon rotation of the substantially rotated version of the first line. As will be discussed in further detail subsequently herein, a scaler 221 is used for scaling a pixel step value based upon rotation of the substantially rotated version so as to generate a scaled pixel step value.

As will be discussed in further detail subsequently herein, functional blocks of the invention are preferably embodied in software executing on the software. For example, the preferred embodiment includes the scaler for scaling the pixel step value based upon a piecewise linear approximation to a trigonometric function of the rotation of the substantially rotated version, so as to generate a scaled pixel step value. The approximation is preferred because a static table 223 of trigonometric values can be used to achieve the approximation with great computational efficiency. The scaler is adapted for generating the scaled pixel step value so as to have an integer portion and a fractional portion. Of course in another preferred embodiment, functional blocks of the invention are embodied in the high performance application specific integrated circuit state machine, instead of software executing on the microprocessor.

The particular trigonometric function used depends on how the rotation is measured. When the substantially rotated version is drawn in the first, fourth, fifth and eighth octants, the rotation is measured relative to the horizontal X major axis as value between zero and one, and the secant of one half pi times the rotation is used as the trigonometric function. If the rotation is such that the substantially rotated version is forty-five degrees relative to either the positive or negative portions of the horizontal X major axis, the rotation is measured as a value of one. If the rotation is such that the substantially rotated version is parallel to the horizontal X major axis, the rotation is measured as a value of zero. Gradations of rotation in between are measured with commensurate fractional values between one and zero.

When the substantially rotated version is drawn in the second, third, sixth and seventh octants, the rotation is measured relative to the vertical Y major axis as value between zero and one, and the cosecant of one half pi times the rotation is used as the trigonometric function. If the rotation is such that the substantially rotated version is forty-five degrees relative to either the positive or negative portions of the vertical Y major axis, the rotation is measured as a value of one. If the rotation is such that the substantially rotated version is parallel to the vertical Y major axis, the rotation is measured as a value of zero. Gradations of rotation in between are measured with commensurate fractional values between one and zero.

Of course, it should be understood that suitable alternative trigonometric functions are used to provide similar beneficial results as in the preferred embodiment if the rotation is measured in a different way. The scope of the invention is not limited to just the preferred way of measuring the rotation of the substantially rotated version of the first line.

FIGS. 3A and 3B show a simplified flow chart for illustrating software executing on the processor element shown in FIG. 2. X Windows graphics conventions are used in the flow chart, as particular discussed in Xlib Programming Manual by Adrian Nye, published by O'Reilly & Associates (1992), pgs. 122–132, which are incorporated herein by reference for background informational purposes.

As shown in block 301 of the flow chart of FIG. 3A, the dash length for the stipple pattern is stored as a 16.16 number: 16 bits of integer and 16 bits of fraction. The fraction is required for the step as modified based on the rotation in accordance with the principles of the invention.

In accordance with X window graphics conventions, dash_offset shown in block 303 is used to specify the starting point of the dash (or stipple) pattern for custom-designed dashed (or stippled) lines. Dash_list shown in block 305 is a real list, with each value representing the length of a single dash or gap in the line.

As shown in block 307 in the flow chart of FIG. 3A, the horizontal line draw variable x is initialized to xstart, which is the horizontal coordinate where the line to be drawn begins. Similarly, the vertical line draw variable y is initialized to ystart, which is the vertical coordinate where the line to be drawn begins.

As shown in block 309 in the flow chart of FIG. 3A, the horizontal component of the line length, xlength, is initialized to difference between the horizontal coordinate where the line ends and the horizontal coordinate where the line begins. Similarly, the vertical component of the line length, ylength, is initialized to difference between the vertical coordinate where the line ends and the vertical coordinate where the line begins.

As shown in block 310, xmajor is set to one or zero depending on whether or not xlength is grater than or equal to ylength. Xlength is used later by the Bresenham or DDA method in determining the correct octant for line drawing. The fractional ratio of ylength to xlength used to set the value of angle to a fractional value between zero and one, when measuring gradations of the rotation between perpendicular and parallel relative to the horizontal X major axis. Major_length is set to the greater one of xlength and ylength for later use in As shown in block 311, the scaled pixel step value, ( step ), is scaled up from the unit step of one, and is computed based upon a piecewise linear approximation to the trigonometric function of the rotation of the substantially rotated version (which is related to xlength and ylength). When the substantially rotated version is drawn in the first, fourth, fifth and eighth octants, the major_length is set equal to xlength in block 310, so therefore $((xlength^2+ylength^2)^{1/2})/major\_ length$ is recognized as the secant function. When the substantially rotated version is drawn in the first, fourth, fifth and eighth octants, the major length is set equal to xlength in block 310, so therefore $((xlength^2+ylength^2)^{1/2})/major\_ length$ is recognized as the secant trigonometric function. When the substantially rotated version is drawn in the second, third, sixth and seventh octants, the major_length is set equal to ylength in block 310, so therefore $((xlength^2+ylength^2)^{1/2})/major\_ length$ is recognized as the cosecant trigonometric function.

As shown in block 313, the while loop test variable that counts the length of the line, line_length_count, is initialized to zero. As shown in block 315, api_dash_length_count, the line style feature pixel counter for counting the pixels of each line style feature, is initialized to zero.

The flow chart is continued in FIG. 3B. The while loop initiated at block 317 continues to draw the substantially rotated version of the first line while line_length_count is less than major_length.

Line style arrays include the length of each stipple pattern feature or each color pattern feature of the array. For example, using the X window graphics convention, a dash_length value is assigned by indexing a stipple pattern line style array called api_dash_list, using the index api_dash_offset, as shown in block 319. A dash_color value is assigned by indexing a color pattern line style array called api_dash_color, using the index api_dash_offset, as shown in block 321.

The while loop initiated at block 323 continues to draw each stipple and color pattern feature while api_dash_count is less than dash_length. Block 325 initiates hardware draw. Block 327 advances the line_length_count. To control line length, block 329 exits the while loops if the line_length_count is equal to the major_length.

In accordance with the principles of the invention, block 331 increments the api_dash_length_count, which is the line style feature pixel counter for counting the pixels of each line style feature, by the scaled pixel step value. This is a key aspect of the invention, because the benefits of the invention flow from incrementing this line style feature pixel counter with the scaled pixel step value, instead of merely incrementing this counter by one.

Block 333 updates the x and y values to the next pixel using a suitable method such as the Bresenham method or DDA method based on xmajor and angle. The nested wile loop terminates and block 335 resets the api_dash_length_count to zero to prepare for counting the pixels of the next consecutive pattern feature of the line style. The api_dash_offset and the api_dash_length_count values are maintained until the next line segment to assure that the line style pattern is consistent across multiple segment polylines. The major while loop terminates when the substantially rotated version of the first line is drawn.

A listing further of detailed pseudocode corresponding the flow chart of FIGS. 3A and 3B is found in Appendix C.

Figure 4:
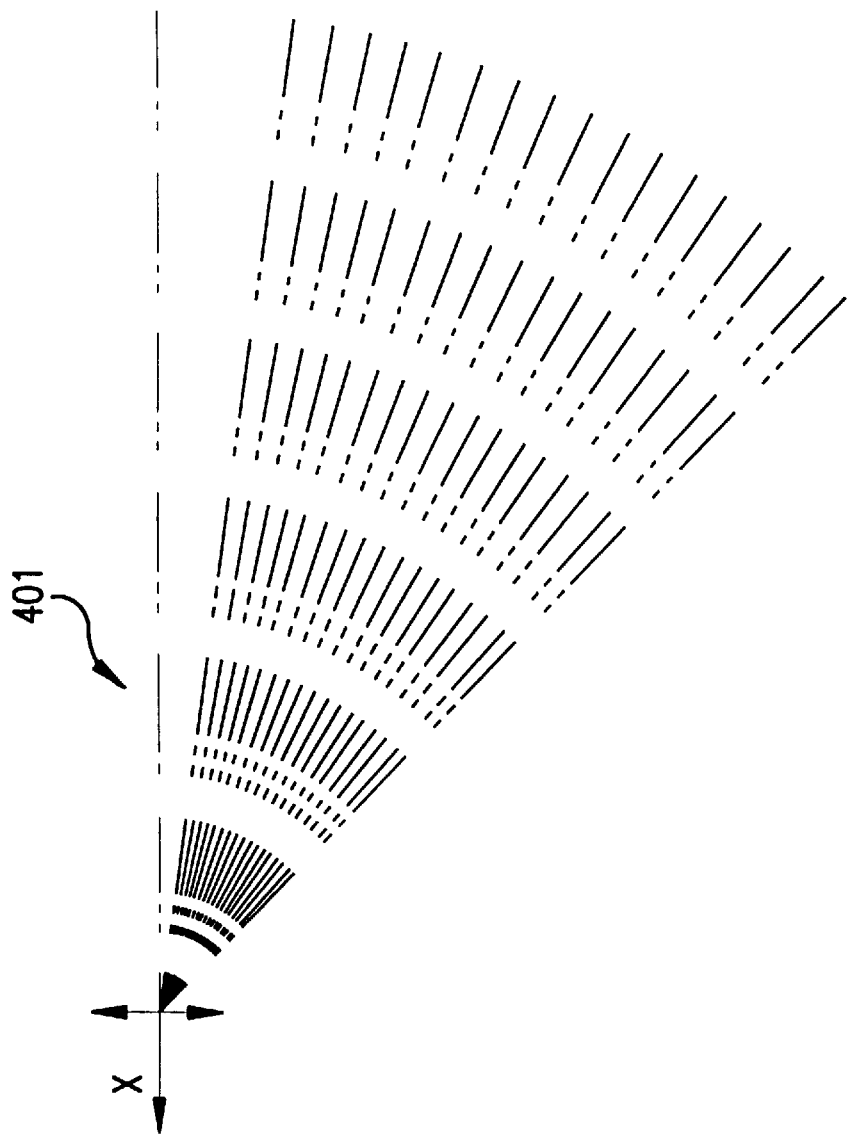
FIG. 4 is an overlay showing lines drawn in real time using the preferred embodiment of the invention.

FIG. 4 is an overlay illustrating line rotation in real time using the preferred embodiment of the invention. A first line 401 has a complex stippled pattern as follows:

16 pixels-on
16 pixels-off
8 pixels-on
8 pixels-off
16 pixels-on

In accordance with the principles of the invention, substantially rotated versions of first line maintain a complex line style pattern that does not change by more than half a pixel as the line is rotated in real time, so as to be identical to the complex line style pattern of the first line. As shown in overlay in FIG. 4, each of seventeen successive substantially rotated versions of the first line include a respective stippled pattern in the substantially rotated versions that is identical to a line style pattern of the first line.

Although specific embodiments of the invention have been described and illustrated, the invention is not to be limited to the specific forms or arrangements of parts so described and illustrated, and various modifications and changes can be made without departing from the scope and spirit of the invention. For example, the invention is applied with beneficial results to anti-aliased lines, which are typically 2-pixel or 3-pixel wide lines. Anti-aliased lines are particularly useful for three dimensional graphics because they remove the artifacts (jagged edges) due to discreet pixels. Within the scope of the appended claims, therefore, the invention may be practiced otherwise than as specifically described and illustrated.

---

APPENDIX A

```
main( )
{
    /* x11 parameters */
    GC       gc;
    XGCValues gcv;
    /* define a stipple pattern */
    /* 4 segments with segment 1 of length 4, segment 2 of length 5,
    etc */
    int       dash_list_length = 4;
    unsigned char *dash_list = 4,5,6,7;
    /* define initial offset into the dash list */
    int dash offset = 0;
    /* open display, create windows, enable input */
    /* set up line style and turn line style on */
    values_mask = GCLineStyle;      /* enable line style */
    gcv.line_style = LineOnOffDash; /* define line style type */
                       /* as arbitary pattern    */
    /* open x11 graphics context for a window */
    /* this enables graphics into the window */
    /* and defines the graphics capabilities */
    /* for the window            */
    gc = XCreateGC(display, rootWindow, values_mask, &gcv);
    /* load the dash list into the x11 */
    XSetDashes(display,gcv,dash_offset,dash_list,dash_list_length);
    /* draw lines */
    for (I = 0; i<50 ; I+=10)
        {
        xstart = 0;
        ystart = 0;
        xend = 50;
        yend = I;
        XDrawLine(display,window,gc,xstart,ystart,xend,yend);
        }
exit( );
}
```

APPENDIX B

```
main( )
{
    int factor;
    unsigned short pattern;
    LineStipple(factor,pattern); /* enter stipple pattern */
    /* the stipple pattern consists of 16 segments each (factor) */
    /* pixels in length */
    glEnable(GL_LINE_STIPPLE);
```

```
        gIBegin(GL_LINES);                    /* reset stipple counters */
            gIVertex2f( 0.0, 0.0);
            gIVertex2f( 1.1, 3.2);             /* call line routine */
            gIVertex2f( 3.2, 6.3);             /* call line routine */
            gIVertex2f( 6.3,10.4);             /* call line routine */
            gIVertex2f(10.4,17.0);             /* call line routine */
        gIEnd( );
        gIBegin(GL_LINES);                    /* reset stipple counters */
            gIVertex2f(100.0,100.0);
            gIVertex2f(101.1,103.2);           /* call line routine */
            gIVertex2f(103.2,106.3);           /* call line routine */
            gIVertex2f(106.3,110.4);           /* call line routine */
            gIVertex2f(110.4,117.0);           /* call line routine */
        gIEnd( );
        }
                        APPENDIX C
int api_dash_list[];
int api_dash_length;
int api_dash_offset;
int count;
int XCreateGC(display, rootWindow, values_mask, gcv)
    {
    /* enable styled lines based on values sent in values_mask and gcv */
    styleLineEnable = ON;
    }
int XSetDashes(display,gcv,dash_offset,dash_list,dash_list_length)
    {
    /* store the dash length as a 16.16 number */
    /* 16 bits of integer and 16 bits of fraction */
    /* the fraction is required for the modified step size */
    api_dash_length = dash_length << 16;
    api_dash_offset = dash_offset;
    api_dash_length_count = 0;
    api_dash_list      = dash_list;
    /* Dash offset keeps track of the current segment in the line */
    /* pattern and count keep track of the count within the line */
    /* segment */
    }
int XDrawLine(display,window,gc,xstart,ystart,xend,yend)
    {
    x = xstart;
    y = ystart;
    xlength = xend - xstart;
    ylength = yend - ystart;
    /* compute the angle in 16.16 format */
    /* 16 bits of integer and 16 bits of fraction */
    /* assumes length of vector is less than 2^15 */
    /* limitation would not be needed in floating point */
if (xlength >= ylength)
    {
    /* x major vector */
    major_length = xlength;
    angle = (ylength << 16)/(xlength << 16);
    xmajor = 1;
    }
else
    {
    /* y major vector */
    major_length = ylength;
    angle = (ylength << 16)/(xlength << 16);
    xmajor = 0;
    }
/*** for current implimentations, step is set to 1.0 ***/
step = 1.0;
/*** scale step size for angle invariant behavior */
step = approximate( ((xlength^2 + ylength^2)^ ½)/major_length);
line_length_count = 0;
while (line_length_count < major_length)
    {
    dash_length = api_dash_list[api_dash_offset];
    dash_color = api_dash_color[api_dash_offset];
    while (api_dash_length_count < dash_length)
        {
        hardware draw pixel at major,minor with dash color
        /* step to next pixel in line */
        line_length_count = line_length_count + 1;
        /* exit XDrawLine routine if the end of the line is reached */
        if (line_length_count == major_length) return;
        /* step dash length counter by modified step value */
        api_dash_length_count = api_dash_length_count + step;
        update x,y to next pixel in line using xmajor and angle;
        }
        api_dash_length_count = 0;
        }
    }
int compute_step(angle,xmajor)
    {
    /*compute the angle dependent step size */
    if (angle < 0)
        angle = -angle;
    /* look_up_index = bits 16:7 of angle if angle is in 16.16 format */
    /* the number of bits used determines the quality of the
    approximation */
    /* use the look_up_index to find the slope and the delta */
    look_up_index = angle & 0x0001f80;
    /* slope is in 1.16 format */
    slope = slope_table[look_up_index];
    delta = delta_table[look_up_index];
    /* Note: data for these tables is illustated in Appendix D*/
    /* Now find the value to add to slope. This is a linear interpolation */
    /* between slope and the next vaue of slope in the table */
    /* notice that the delta has fewer bits than the slope. */
    linear_slope    = (angle & 0x0000003f) * delta;
    /* shift linear_slope down by the number of bits of angle used */
    linear_slope    = linear_slope >> 6;
    step = slope + linear_slope;
    return (step);
    }
```

What is claimed is:

1. A method comprising steps of:
    displaying a first line having a line style pattern on a raster computer graphics display; and
    displaying in real time a substantially rotated version of the first line on the raster computer graphics display so that the substantially rotated version maintains a line style pattern that is identical to the line style pattern of the first line.

2. A method as in claim 1 wherein:
    the step of displaying the first line includes displaying a stippled pattern of the first line on a raster computer graphics display; and
    the step of displaying the substantially rotated version of the first line includes maintaining a stippled pattern in the substantially rotated version that is identical to the stippled pattern of the first line.

3. A method as in claim 1 wherein:
    the step of displaying the first line includes displaying a colored pattern of the first line; and
    the step of displaying the substantially rotated version of the first line includes maintaining a colored pattern in the substantially rotated version that is identical to the colored pattern of the first line.

4. A method as in claim 1 wherein the step of displaying the substantially rotated version of the first line on the raster computer graphics display includes printing the substantially rotated version on a video display.

5. A method as in claim 1 wherein the step of displaying the substantially rotated version of the first line includes controlling the line style of the substantially rotated version based upon rotation of the substantially rotated version.

6. A method as in claim 5 wherein the step of displaying the substantially rotated version of the first line includes the step of:
    providing a computer memory;
    storing in the computer memory consecutive line style pattern features of the substantially rotated version of the first line while assigning a respective length value to each of the pattern features;
    scaling a pixel step value based upon the rotation of the substantially rotated version so as to generate a scaled pixel step value; and providing a line style feature pixel counter for counting the pixels of each line style pattern feature;

drawing a pixel;

incrementing the pixel counter by the scaled pixel step value; and comparing the incremented pixel counter to the respective length value.

7. A method as in claim 6 wherein the step of scaling the pixel step value includes scaling the pixel step value based upon a trigonometric function of the rotation of the substantially rotated version, so as to generate the scaled pixel step value.

8. A method as in claim 6 wherein the step of scaling the pixel step value includes scaling the pixel step value based upon a piecewise linear approximation to a trigonometric function of the rotation of the substantially rotated version, so as to generate the scaled pixel step value.

9. A method as in claim 6 wherein:

the step of scaling the pixel step value includes generating the scaled pixel step value having an integer portion and a fractional portion; and the step of comparing the incremented pixel counter to the respective length value includes comparing an integer portion of the incremented pixel counter to the respective length value.

10. A method as in claim 5 wherein the step of displaying the substantially rotated version of the first line includes the step of:

generating consecutive line style pattern features of the substantially rotated version of the first line;

assigning a respective length value to each of the pattern features;

scaling the respective length value for each of the pattern features based upon the rotation of the substantially rotated version, so as to generate respective scaled length values; and displaying the substantially rotated version of the first line using the scaled length values for each of the pattern features, so that the substantially rotated version maintains the line style pattern that is the identical the line style pattern of the first line.

11. A method as in claim 10 wherein the step of scaling the respective length value includes scaling the respective length value based upon a trigonometric function of the rotation of the substantially rotated version, so as to generate the respective scaled length value.

12. A method as in claim 10 wherein the step of scaling the respective length value includes scaling the respective length value based upon a piecewise linear approximation to a trigonometric function of the rotation of the substantially rotated version, so as to generate the respective scaled length value.

13. An apparatus comprising:

a raster computer graphics display;

means coupled with the display for displaying a first line having a line style pattern on the display; and means coupled with the display for displaying in real time a substantially rotated version of the first line on the display so that the substantially rotated version maintains a line style pattern that is the identical the line style pattern of the first line.

14. An apparatus comprising:

a raster computer graphics display;

a controller coupled with the raster computer graphics display for displaying a first line having a line style pattern on the raster computer graphics display, and for displaying in real time a substantially rotated version of the first line on the raster computer graphics display so that the substantially rotated version maintains a line style pattern that is the identical the line style pattern of the first line, the controller including:

a processor element;

a memory coupled with the processor element for storing consecutive line style pattern features of the substantially rotated version of the first line and assigning a respective length value to each of the pattern features;

a scaler for scaling a pixel step value based upon rotation of the substantially rotated version so as to generate a scaled pixel step value;

a line style feature pixel counter for counting the pixels of each line style pattern feature;

an incrementer for incrementing the pixel counter by the scaled pixel step value; and a comparator for comparing the incremented pixel counter to the respective length value.

15. An apparatus as in claim 14 wherein the scaler is adapted for scaling the pixel step value based upon a trigonometric function of the rotation of the substantially rotated version, so as to generate the scaled pixel step value.

16. An apparatus as in claim 14 wherein the scaler is adapted for scaling the pixel step value based upon a piecewise linear approximation to a trigonometric function of the rotation of the substantially rotated version, so as to generate the scaled pixel step value.

17. An apparatus as in claim 14 wherein:

the scaler is adapted for generating the scaled pixel step value having an integer portion and a fractional portion; and the comparator is adapted for comparing the integer portion of the pixel counter to the respective length of the pattern feature.

18. An apparatus comprising:

a raster computer graphics display;

a controller coupled with the raster computer graphics display for displaying a first line having a line style pattern on the raster computer graphics display, and for displaying in real time a substantially rotated version of the first line on the raster computer graphics display so that the substantially rotated version maintains a line style pattern that is the identical the line style pattern of the first line, the controller including:

a pattern generator for generating consecutive line style pattern features of the substantially rotated version of the first line while assigning a respective length value to each of the pattern features;

a scaler for scaling the respective length value for each of the pattern features based upon rotation of the substantially rotated version, so as to generate respective scaled length values; and a display generator coupled with the pattern generator and the raster computer graphics display for generating the display of the substantially rotated version of the first line.

19. An apparatus as in claim 18 wherein the scaler is adapted for scaling the respective length value based upon a trigonometric function of the rotation of the substantially rotated version, so as to generate the respective scaled length value.

20. An apparatus as in claim 18 wherein the scaler is adapted for scaling the respective length value based upon a piecewise linear approximation to a trigonometric function of the rotation of the substantially rotated version, so as to generate the respective scaled length value.

* * * * *